July 18, 1944.  F. A. WAGNER  2,353,774
CYLINDER LINER FORCING MANDREL
Filed Oct. 22, 1941
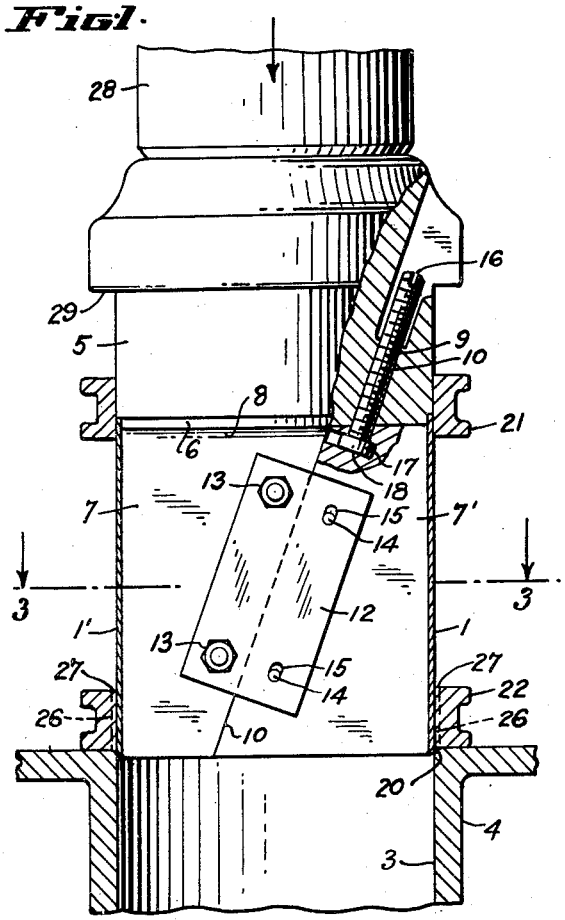
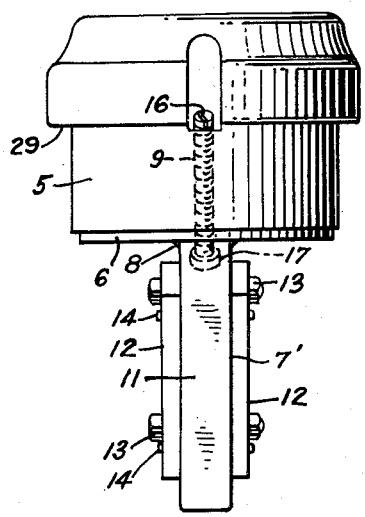
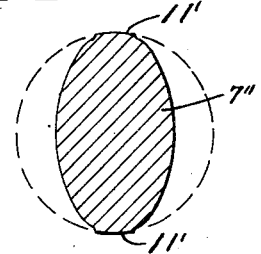
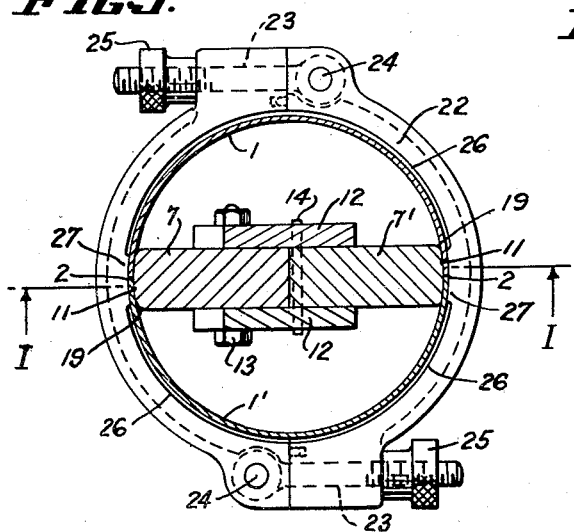
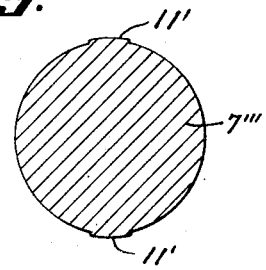
INVENTOR.
FREDERICK A. WAGNER
BY
ATTORNEY.

Patented July 18, 1944

2,353,774

UNITED STATES PATENT OFFICE 2,353,774

CYLINDER LINER FORCING MANDREL

Frederick A. Wagner, Oakland, Calif.

Application October 22, 1941, Serial No. 416,090

9 Claims. (Cl. 29—282)

This invention relates to the lining of engine cylinders and other work cylinders with preformed thin flexible sheet metal liners having one or more longitudinal free butt-joints, and particularly to special mandrel means for forcing such liners longitudinally into the cylinders.

The principal object of the invention is to provide an improved method and means for longitudinally forcing or "press fitting" such thin liners into the engine or other work cylinder while insuring tight seating of the liners against the interior of the cylinder and a tight smooth butt-joint or joints at the longitudinal edges of the liner sheet or cylindrical segments.

Other objects and advantages of the invention will appear in the following description and accompanying drawing.

In the drawing, Fig. 1 is an elevation, partly in section showing a cylinder being lined with a thin flexible sheet metal segmented liner being longitudinally forced into place with a special press mandrel formed to carry out my invention.

Fig. 2 is a side view of the mandrel of Fig. 1 shown separately.

Fig. 3 is a cross section of Fig. 1 as seen from the line 3—3 thereof.

Fig. 4 is a cross section of a modified form of the mandrel.

Fig. 5 is a cross section of another modified form of the mandrel.

Before describing the drawing in more detail it may be stated that thin flexible sheet metal liners in engine and pump cylinders may be of several varieties, one in which the liner is a thin drawn seamless tube for forcing into the engine cylinder, another wherein a sheet is rolled into complete tubular form and the longitudinal joint welded and finished before forcing into the engine cylinder, and thirdly, wherein the thin sheet metal liner is rolled to cylindrical form and with the longitudinal abutting edges left free or unattached, and fourthly, wherein the cylindrical sheet metal liner is composed of two or more segments of a cylinder with their longitudinal abutting edges left free or unattached, and it is with the third and fourth variety of thin flexible sheet metal liners for engine and other work cylinders that the present invention is concerned, the drawing showing the liner as being composed of two half cylinders accurately preformed as by rolling, stamping, or curling through dies, to provide a pair of cylindrical segments 1 and 1', which when arranged in confronting relation with longitudinal edges abutting as at 2 will yield a thin flexible sheet metal cylindrical shell of a size adapted to be tightly press fitted into the true bore 3 of an engine or work cylinder 4 by forcibly pushing the assembled segments directly into one end of the cylinder until fully seated therein.

However, in practice it is extremely difficult to press such an assemblage of thin sheet metal cylindrical segments properly into an engine cylinder whether the liner be composed of two halves, or three or more segments, or whether it be a single rolled sheet with but one free joint, and for the reason that the abutting edges will not generally lie tightly against the cylinder wall for their full length, but will be slightly out of place at points, and require internal rolling or other treatment in order to smooth out the joint, but which is only accomplished under great difficulty.

If the thin flexible liner is supported from within by a fitting mandrel while pushing in the segments, the joint at the abutting edges of the sheet metal may be made smooth, but this has the objection that it interferes with freedom of the main body of the sheet metal to flex and accommodate itself to the cylinder bore as it is forced in, and also greatly increases the friction—especially if the mandrel be the slightest degree too large, and so that after the liner is in place it is difficult to get the mandrel out again.

However, I have discovered that a perfect job of press fitting such free joint thin flexible liners may be easily secured if the liners are supported from within along the abutting edges only while leaving the remainder of the liner shell substantially free for local adjustment.

To carry out the method I provide a special mandrel, the upper portion of which is designated 5 in the drawing and which is of an exterior diameter substantially that of the exterior diameter of the assembled liner shells 1 and 1' or preferably just a trifle smaller, and formed on the lower end of which mandrel portion 5 is a narrow reduced shoulder 6 of an exterior diameter equal to the interior diameter of the assembled liner shells or segments, while extending downwardly from the shoulder portion 6 is a narrow flat wall portion preferably formed of two sections 7 and 7', the first of which 7 is rigidly secured at its upper end to portion 6, as by welding as at 8 or otherwise, or formed integral therewith, and the other section 7' is normally held upward against shoulder portion 6 as by a bolt or screw 9 threaded only in a hole 10 extending angularly upward in member 5 and with the slot 16 of the screw freely accessible from above as indicated in Fig. 1.

The two sections 7 and 7' are formed with angularly disposed meeting faces 10 so that upon sliding section 7' downwardly against section 7 the distance across both sections to their outer edges 11 will be reduced, and will be at maximum when the upper end of section 7' is in contact with the lower surface of shoulder member 6.

To slidably support section 7' in relation to section 7 a pair of guide plates 12 are arranged against opposite sides of the sections in straddling relation to the joint 10 and are rigidly secured to one of the sections as by bolts 13 and slidably to the other sections as by pins 14 working in slots 15 in the plates extending parallel to the joint 10, and to provide for positively forcing section 7' down or up screw 9 is provided with a head 17 on its lower end engaging within a T slot 18 formed in the upper end of section 7'.

The distance overall across the two flat mandrel sections 7 and 7' when section 7' is tight against the lower end of member 6 is at least equal to the internal diameter of the liner shells and the outer edges of these sections are formed to this diameter as by turning or grinding, and the corners are preferably rounded off as at 19. Instead of having the outer diameter of the flat mandrel sections equal to the inner diameter of the lining shells, it is preferable to have it just a trifle greater, say .002" for the average automobile engine cylinder, so as to in fact temporarily stretch or distort the engine cylinder very slightly in direction of the liner section joints when they are forced into the cylinder, the extreme lower ends of the liner shells as at 20 being chamfered off slightly, and/or the upper edge of the engine cylinder, to aid in initial entry.

In applying the liner shells 1 and 1' to a cylinder, the shells are assembled about the flat mandrel 7, 7' with their upper margins engaging around the shoulder 6 and they are preferably held in position by a pair of split clamp rings 21, 22, the two halves of which are preferably secured with quick detachable bolts 23 pivoted to one ring section as at 24 and provided with thumb nuts 25, and while the upper clamp ring 21 is provided with a uniform bore of a size to receive the outside of the assembled liner shells, the lower ring 22 firmly contacts the exterior of the liner shells preferably only along the joints of the shell overlying the inner contact made by the outer edges of the flat mandrel portions 7, 7', and it is desirable that these contacting areas be reduced to about a half inch in width so as to localize the pressure along these joints. This localizing of the pressure along the joints or abutting edges of the liner shells is particularly important at the initial point of entry of the shells into the engine cylinder, and it is therefore desirable that the lower clamp ring 22 be of slightly larger diameter than the outside of the shells except along the joints over the edges of the flat mandrel. This relieved portion of the lower clamp ring is indicated at 26 and leaving internal pressure areas designated 27.

In forcing the thus assembled liner cylindrical segment shells into the engine cylinder, the upper ring 21 is clamped around the upper margins of the liner shells to hold them about round shoulder 6 and with the ring extending somewhat over the mandrel portion 5 which is just a sliding fit within the ring 21, and the lower ring 22 is clamped about the segment shells so as to bring its internal pressure areas 27 over the joints 2 of the shells which are in turn aligned centrally over the pressure edges 11 of the flat mandrel portion, all as shown in Fig. 3 and with the shells projecting a short distance below ring 22 to facilitate initial entry into the engine cylinder 4 as shown in Fig. 1, and with the engine cylinder 4 firmly supported from below, a downward pressure is applied to the upper end of the compound mandrel 5, 6, 7, as by a mechanical or hydraulic press ram 28 until the liner segment shells are completely seated within the cylinder, and after which screw 9 is turned to force section 7' of the flat mandrel portion downwardly and thus relatively collapse this portion to relieve its pressure from the joints and permit easy withdrawal of the mandrel.

In the lining of many same size cylinders it is desirable to have the round portion 5 of the mandrel of such a length and provided with an enlarged shoulder 29 at its upper end so that when this shoulder comes into contact with ring 21 and the latter is in contact with ring 22, it will form a stop for the press and the liner shells will be in the desired final position.

In the downward movement of the mandrel the assembled shells first slide through clamp ring 22 seated on the upper end of the cylinder, and when clamp ring 21 has descended and contacted ring 22 the round portion 5 of the mandrel continues downward pushing the liner shells through both rings and following them through the rings to final position.

By the method and apparatus described, the abutting but unattached longitudinal edges of the liner shell are held in absolutely flush relation from the initial point of entry into the cylinder and until final position, and since the outward aligning pressure is localized along the joints only, it greatly reduces the friction involved in forcing such liners to position, while positively assuring flush joints or seams, and at the same time leaves the remainder of the liner substantially free from inward restraint in adjusting itself to the stresses set up and seating itself perfectly at all points against the inner wall of the cylinder.

In carrying out the operation, the sliding surfaces of all members are lubricated, preferably with oil or grease. The collapsible feature of the flat portion 7, 7' of the mandrel permits its free withdrawal, but attention is called to the fact that by thus localizing the pressure along the joints or seams, it is possible to have the mandrel a tight fit and still withdraw it from the finally positioned liner shells without disturbing them, as their frictional resistance against dislodgment is far greater. Accordingly, the lower portion of the mandrel could be solid, and also of a cross section as shown in Figs. 4 or 5 wherein the body of the mandrel is designated 7" and 7"' respectively, and the localized pressure areas to align the liner shell joints are designated 11'.

In contemplating the invention as above set forth it is evident without further illustration that it may be used for inserting thin flexible sheet metal liner shells into engine, pump, or other work cylinders to insure flush smooth joints of the abutting liner edges, whether the liner is composed of two segments or halves as shown in the drawing, or whether a single rolled shell with but one free joint is used, and if there are more than two segments to the liner the mandrel and lower clamping ring are provided with the corresponding number of pressure localizing areas for the seams.

It is also evident that for continued use the special mandrel may be permanently secured to the press ram 28 or formed integrally therewith. Also that all wearing parts should be suitably hardened or treated to insure long life.

In regard to localizing the mandrel pressure along the butt seams or joints to force the inner surfaces of the liner margins to flush relation at the butt joints, it may be thought that a plain round mandrel would be just as good, or that if when the liner was seated it showed any unevenness along the butt joint or joints that the inwardly projecting edge could be forced outwardly or hammered outwardly to flush relation, but such is not the case for a round mandrel if made oversize to secure the same pressure as the localizing mandrel would have to stretch the cylinder in all directions to probably crack it, whereas the oversize localizing pressure while it elongates the cross section slightly in one direction, merely distorts the cylinder slightly as the balance of the cylinder may collapse slightly. If a liner is once inserted with its butt joint or joints not quite flush, it has been found impractical to make it flush by rolling or hammering without battering the inwardly projecting portions of the uneven joint.

Also, if lower clamp ring 22 is of simple round bore fitting tightly about the liner segments so as to hold the liner joint or joints in very tight edgewise contact they lack the freedom to adjust themselves to perfect flush relation when they enter the cylinder, which they have when providing localized pressure areas on the ring as this does not tend to crowd the segments into edgewise contact, but aids the inner localized pressure of the localized mandrel contact in holding the margins of the joint absolutely flush, while entry into the cylinder provides the edgewise contacting pressure.

Having thus described my invention, what I claim is:

1. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner formed to support the liner from within along an area localized over the joint to maintain the edges of the liner flush at said joint as the liner enters the cylinder when the mandrel is operated, and means localizing pressure along the joint at the outside of the liner adjacent the point of entry of the liner into the cylinder.

2. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner formed to support the liner from within along an area localized over the joint to maintain the edges of the liner flush at said joint as the liner enters the cylinder when the mandrel is operated, said extension being of a length to so support the liner from within for substantially the full length of the liner, and means for collapsing said extension to relieve the joint from its localized interior support.

3. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner formed to support the liner from within along an area localized over the joint to maintain the edges of the liner flush at said joint as the liner enters the cylinder when the mandrel is operated, said extension being of a length to so support the liner from within for substantially the full length of the liner, and being of substantially flat form with its edges arranged to contact the liner, and means for collapsing said extension edgewise.

4. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner formed to support the liner from within along an area localized over the joint to maintain the edges of the liner flush at said joint as the liner enters the cylinder when the mandrel is operated, said extension being of a length to so support the liner from within for substantially the full length of the liner, and being of substantially flat form with its edges arranged to contact the liner, and means for collapsing said extension edgewise, comprising providing a loose wedge section to said extension slidable lengthwise against the remainder of the extension, means guiding the wedge section for movement, and screw means for moving the wedge section accessible at the outer portion of the mandrel after the liner has been forced to final position.

5. In a cylinder liner press mandrel for press fitting assembled cylindrical sheet metal liner segments into a cylinder bore, a mandrel provided with a shoulder adapted to engage the outer ends of the assembled liner segments, an extension of the mandrel passing into the assembled liner segments formed to support them internally along their abutting edges while maintaining the remainder of the segments substantially free for flexing, a collar adapted to surround the liner segments formed with spaced inwardly projecting seats adapted to provide localized support over the abutting edges of the liner segments as they are forced into the cylinder bore, and means for relieving the mandrel support from along the abutting edges of the segments after the segments are forced into a cylinder bore before withdrawal of the mandrel.

6. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner and formed to support the liner from within, said extension provided with a relatively narrow longitudinal pressure strip of a width to tightly contact the liner along the joint only and being of a size to force the edges of the joint outwardly and tightly against the bore of the cylinder along an area localized over the longitudinal joint to maintain the edges of the liner flush at said joint as the liner enters the cylinder when the mandrel is operated.

7. Apparatus for inserting thin flexible sheet metal cylindrical longitudinally jointed liners into a cylinder, comprising a press mandrel provided with a shoulder adapted to engage the outer end of the sheet metal liner and provided with an extension passing within the liner and formed to support the liner from within, said extension provided with a relatively narrow longitudinal pressure strip of a width to tightly contact the liner along the joint only and being of a size to force the edges of the joint outwardly and tightly against the bore of the cylinder along an area localized over the longitudinal joint to maintain the edges of the liner flush at said joint as the liner enters the cylinder when the mandrel is operated, said extension being of a length to so support the liner from within for substantially the full length of the liner.

8. A cylinder liner press mandrel for press fitting assembled cylindrical longitudinally segmented sheet metal liner shells with longitudinal edges abutting into a cylinder bore, an extension on the mandrel passing into the assembled liner segment shells formed to support them internally along their abutting edges said extension provided with a relatively narrow longitudinal pressure strip of a width to tightly contact the liner along the abutting edges only and being of a size to force the edges of the joint outwardly and tightly against the bore of the cylinder as the liner enters while maintaining the remainder of the segments substantially free for flexing.

9. A cylinder liner press mandrel for press fitting assembled cylindrical longitudinally segmented sheet metal liner shells with longitudinal edges abutting into a cylinder bore, an extension on the mandrel passing into the assembled liner segment shells formed to support them internally along their abutting edges, said extension provided with a relatively narrow longitudinal pressure strip of a width to tightly contact the liner along the abutting edges only and being of a size to force the edges of the joint outwardly and tightly against the bore of the cylinder as the liner enters while maintaining the remainder of the segments substantially free for flexing, and means for relieving the mandrel support from along the abutting edges of the segments after the segments are forced into a cylinder bore before withdrawal of the mandrel.

FREDERICK A. WAGNER.